US012219594B2

(12) United States Patent
Terabe et al.

(10) Patent No.: US 12,219,594 B2
(45) Date of Patent: Feb. 4, 2025

(54) CONTROL APPARATUS FOR PRESENTING COMMUNICATION REQUIREMENT, CONTROL METHOD, AND COMPUTER-READABLE STORAGE MEDIUM

(71) Applicant: KDDI CORPORATION, Tokyo (JP)

(72) Inventors: Shigeo Terabe, Tokyo (JP); Shinobu Nanba, Fujimino (JP); Tooru Kitayabu, Tokyo (JP); Hayato Yoshida, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 735 days.

(21) Appl. No.: 17/338,998

(22) Filed: Jun. 4, 2021

(65) Prior Publication Data
US 2021/0298031 A1 Sep. 23, 2021

Related U.S. Application Data

(63) Continuation of application No. PCT/JP2019/047892, filed on Dec. 6, 2019.

(30) Foreign Application Priority Data

Dec. 7, 2018 (JP) .................. 2018-230159

(51) Int. Cl.
*H04W 72/543* (2023.01)
*H04L 45/302* (2022.01)
(Continued)

(52) U.S. Cl.
CPC ......... *H04W 72/543* (2023.01); *H04L 45/302* (2013.01); *H04W 72/56* (2023.01); *H04W 76/15* (2018.02)

(58) Field of Classification Search
None
See application file for complete search history.

(56) References Cited

U.S. PATENT DOCUMENTS

| 8,392,574 B1* | 3/2013 | Shah ............... G06F 9/5061 |
| | | 709/225 |
| 2011/0213712 A1* | 9/2011 | Hadar ............... G06Q 30/04 |
| | | 705/34 |

(Continued)

FOREIGN PATENT DOCUMENTS

| JP | 2000-152337 A | 5/2000 |
| JP | 2017-011467 A | 1/2017 |

(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 13)", 3GPP TS36.300, V13.4.0, Jun. 2016, 310 pages.

(Continued)

*Primary Examiner* — Mohammad S Adhami
(74) *Attorney, Agent, or Firm* — Foley & Lardner LLP

(57) ABSTRACT

A control apparatus identifies a first communication requirement and identifies a second communication requirement which is an alternative candidate to the first communication requirement on the basis of a service requirement received from a user, identifies an amount of resource requested for the first communication requirement and the second communication requirement, notifies the user of information indicating the second communication requirement and information relating to the amount of the resource identified for each of the first communication requirement and the second communication requirement, receives a selection of the first communication requirement or the second communication (Continued)

requirement by the user, and executes control to secure the resource amount identified for the communication requirement selected by the user.

18 Claims, 4 Drawing Sheets

(51) Int. Cl.
*H04W 72/56* (2023.01)
*H04W 76/15* (2018.01)

(56) References Cited

U.S. PATENT DOCUMENTS

| | | | |
|---|---|---|---|
| 2013/0079054 A1* | 3/2013 | Jouin | G06F 3/167 455/552.1 |
| 2019/0149666 A1 | 5/2019 | Senarath | |
| 2019/0261186 A1 | 8/2019 | Xu | |
| 2021/0136158 A1* | 5/2021 | Finkelstein | H04L 47/803 |

FOREIGN PATENT DOCUMENTS

| | | |
|---|---|---|
| JP | 2018-521564 A | 8/2018 |
| WO | WO-2018/076547 A1 | 5/2018 |

OTHER PUBLICATIONS

Nishihara, et al., "Proposal of QoS Control Method for End-to-End Slice Between Operators", Proceedings of the 2018 IEICE General Conference, The Institute of Electronics, Information and Communication Engineers, Mar. 2018, with non-official partial English translation, 3 pages.

Turk Telekom, "Network Slicing Solution with RAN Slicing", TSG SA Meeting #SP-73 SP-160534, Sep. 21-23, 2016, [online], 3GPP SA WG2 TD, 9 pages.

* cited by examiner

F I G. 2

| SLA No. | TOLERABLE LATENCY | TOLERABLE ERROR RATE | TRANSMISSION CYCLE | MONTHLY DATA AMOUNT | REQUIRED RADIO QUALITY | CONSUMED RESOURCE AMOUNT | |
|---|---|---|---|---|---|---|---|
| | | | | | | RESOURCE A | RESOURCE B |
| 100 | 1 hour | 0.1 % | 2 hours | 600 kB | 10dB | 10 % | 10 % |
| 101 | 1 hour | 0.1 % | 4 hours | 600 kB | 10dB | 10 % | 8 % |
| 102 | 1 hour | 10 % | 2 hours | 600 kB | 10dB | 5 % | 10 % |
| ... | ... | ... | ... | ... | ... | ... | ... |
| 200 | 30 sec. | 0.1 % | 1 min | 600 kB | 10dB | 10 % | 10 % |
| 201 | 30 sec. | 0.1 % | 2 min | 600 kB | 10dB | 10 % | 8 % |
| 202 | 30 sec. | 10 % | 1 min | 600 kB | 10dB | 5 % | 10 % |
| ... | ... | ... | ... | ... | ... | ... | ... |

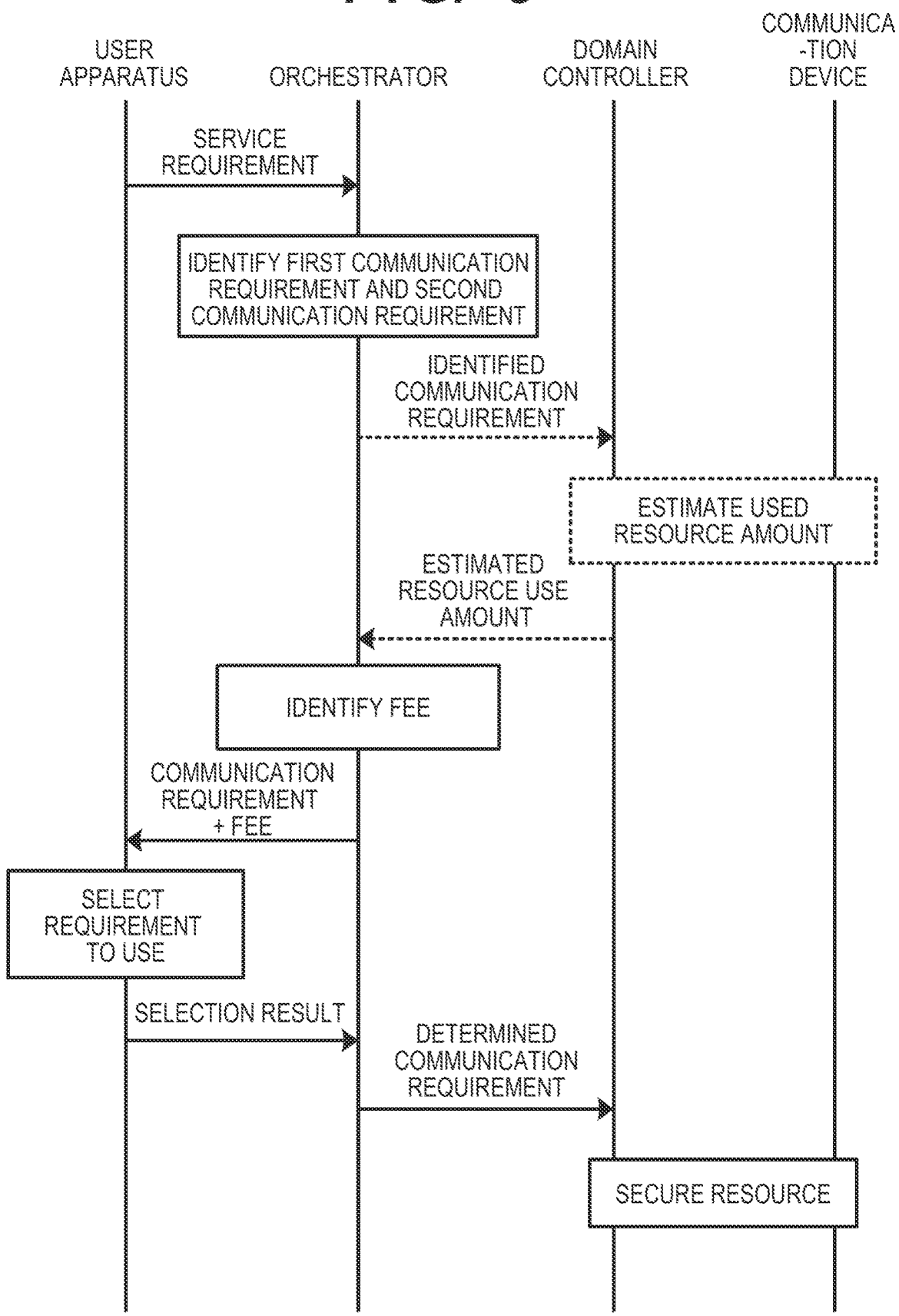

CONTROL APPARATUS FOR PRESENTING COMMUNICATION REQUIREMENT, CONTROL METHOD, AND COMPUTER-READABLE STORAGE MEDIUM

CROSS-REFERENCE TO RELATED APPLICATION(S)

This application is a continuation of International Patent Application No. PCT/JP2019/047892 filed on Dec. 6, 2019, which claims priority to and the benefit of Japanese Patent Application No. 2018-230159 filed on Dec. 7, 2018, the entire disclosures of which are incorporated herein by reference.

BACKGROUND OF THE INVENTION

Field of the Invention

The present invention relates to a control apparatus, a control method, and a computer-readable storage medium and specifically relates to technology for assisting the setting of a communication requirement when providing a service.

Description of the Related Art

The fifth generation of wireless communication systems has become a topic of investigation for the 3rd Generation Partnership Project (3GPP). In fifth generation systems, end-to-end (E2E) network slicing is being explored. E2E network slicing is a logical separation, on a service basis, of a network including various domains, such as wireless domains and core network domains. E2E network slicing enables communications for various services with varying requirements to be accommodated together yet function independently. With E2E network slicing, a control function referred to as an orchestrator executes the management and control of the state of the various domains including in the network.

The orchestrator receives a service requirement for execution from a user, such as an end user of a provider or service that provides a communication service, and identifies a communication requirement (for example, tolerable latency, tolerable error rate, required radio quality, and the like) corresponding to the service requirement. The orchestrator, for example, may query a controller of each domain as to whether or not this communication requirement can be satisfied, bring together all this information, and notify the user of whether or not communication with the requested service requirement is possible.

CITATION LIST

Non Patent Literature

NPL1: 3GPP TS36.300, V13.4.0, June 2016

Depending on the user situation, including wireless environment and the like, the necessary radio resources needed to satisfy the communication requirement are difference and the amount of the calculation resources of the useable device/s in the system for providing the service to the user is different. Thus, for example, in a case where a user opts to receive provision of a service without considering the amount of the radio resources required for communication, the user may be charged a high communication fee or may be unable to receive the service in an acceptable form due to not having sufficient useable calculation resources, leading to poor user-friendliness.

SUMMARY OF THE INVENTION

The present invention provides a technique for enhancing user-friendliness when a service is performed using communication.

A control apparatus according to an aspect of the present invention includes: a first identification unit configured to, on the basis of a service requirement received from a user, identify a first communication requirement and to identify a second communication requirement which is an alternative candidate to the first communication requirement; a second identification unit configured to identify an amount of resource requested for the first communication requirement and the second communication requirement; a notification unit configured to notify the user of information indicating the second communication requirement and information relating to the amount of the resource identified for each of the first communication requirement and the second communication requirement; a reception unit configured to receive a selection by the user of the first communication requirement or the second communication requirement; and a control unit configured to execute control to secure the resource amount identified for the communication requirement selected by the user.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 2 is a diagram illustrating an example configuration of a list including communication requirements and consumed resource amounts.

FIG. 5 is a diagram illustrating an example of a processing flow.

DESCRIPTION OF THE EMBODIMENTS

Figure 1:
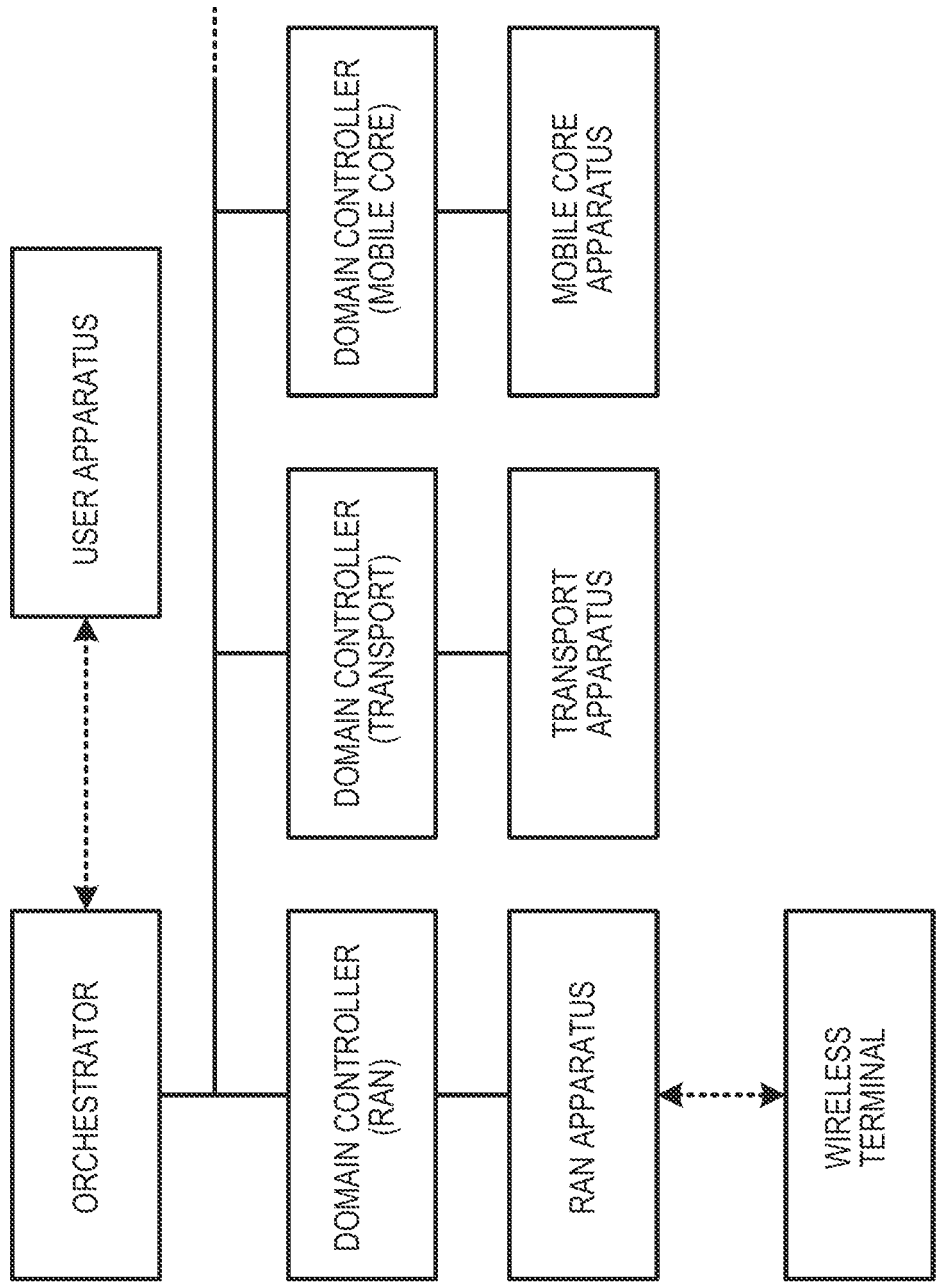
FIG. 1 is a diagram illustrating an example of a system configuration.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

System Configuration

FIG. 1 is a diagram illustrating an example configuration of a system according to the present embodiment. For example, the present system is a fifth generation (5G) wireless communication system that is capable of implementing E2E network slicing in which a network is logically separated per service. Also, for example, the present system includes domain controllers, such as a radio access network (RAN) controller that manages a RAN domain, a transport controller that manages a transport domain, a mobile core controller that manages a mobile core domain, and the like, and an orchestrator that executes control of the domain controllers. Each domain controller is configured to control a device for executing communication processing in their domain. For example, the RAN controller is capable of controlling a RAN apparatus (for example, a base station apparatus, a control station that controls a base station, and the like) that executes various RAN processing and capable enabling communication with a wireless terminal. Also, in the present embodiment, a user apparatus is configured to communicate with at least the orchestrator. Note that the "user" referred to here includes not only an end user that receives a communication service using communications, but also a service provider that provides such a communication service and other entities relating to a communication service. Also, the "user" referred to here is not necessarily a human, and also includes an information processing system used by a service provider or the like and an application included in a wireless terminal or the like, for example. In other words, human intermediary is not necessary, and a discretionary entity that provides information such as instructions to the system according to the present embodiment and obtains information from the system according to the present embodiment is referred to as the "user". The user apparatus may be a wireless terminal such as that described above or may be a network apparatus that performs wired communication. Note that the configuration of the system described above is merely an example, and other configurations may be used, and the system may be used for other purposes. For example, the system described above may be applied to a non-5G wireless communication system or a wired communication system, or a configuration different from that illustrated in FIG. 1 may be used to implement the functions described below.

In the system of FIG. 1, the user apparatus transmits information indicating a service requirement to the orchestrator. The service requirement referred to here is discretionary information capable of identifying, in the system, a communication requirement necessary for providing a service corresponding to the service requirement. When the orchestrator obtains the information indicating the service requirement, the orchestrator identifies the communication requirement indicating a requirement relating to communication.

In this example, even in a case where the same communication requirement is satisfied, the ease with which the consumption amount of the various resources relating to communication, such as the required amount of the radio resources (frequency resource, time resource, space resource, and the like), amount of calculation resources, and the like, can be secured differs depending on the environment that satisfies the communication requirement. For example, to enable communications for a new service while many radio resources for a service slice corresponding to a required service requirement are already in use, for example, it may be necessary to temporarily stop communications for the currently performed services and secure radio resources for the new service. However, despite the same amount of radio resources being used, in a case where the usage rate of the radio resources for the service slice corresponding to the service requirement is low, it may be unnecessary to work to temporarily stop existing communications, thus making radio resources easy to secure. Also, despite it being easy to secure radio resources, in a case, for example, where there is a large amount of calculations for another communication service, securing calculation resources for executing calculation processing relating to the new service may be not easy. However, in a case where the usage rate of the calculation resources is low, it may be easy to secure the calculation resources for the new service. In this manner, being able to increase the ease with which resources can be secured in cases where the ease with which resources can be secured changes depending on the situation provides benefits to the business operator. This can also bring benefits to the user in terms of lowering communication fees due to resources being easy to secure, for example. Also, even in a case where a communication requirement corresponding to a service requirement reported from the user apparatus can be satisfied, the user does not know how much resources will be used. Thus, for example, with the user not knowing in advance the required cost for securing the necessary radio resources to execute the service, user-friendliness can be expected to be poor. Also, for example, the user can not realize of the possibility of cases such as where the amount of used resources, such as radio resources, decreases due to a change in at least a portion of the service requirement leading to a possible decrease in fees.

In light of the foregoing, the control apparatus (orchestrator) of the present embodiment identifies a communication requirement corresponding to a notified service requirement, identifies the amount of requested resources in the communication requirement and the fee to be determined according to the resource amount, and notifies the user of the fee information. In this manner, the user can know in advance the fee required for the service to be performed and can determine not to use the service on the basis of the fee for the service able to be performed being too high, for example. Also, the orchestrator, at this time, identifies a first communication requirement based on the notified service requirement and a second communication requirement which is an alternative candidate to the first communication requirement and informs the user of fee information relating to the first communication requirement as well as the second communication requirement. Note that in a case where the user is informed of the fee corresponding to the first communication requirement in advance, the notification of the fee relating to the first communication requirement may not be performed. Also, in a case where the information relating to the second communication requirement reveals that the fee corresponding to the second communication requirement is cheap, the user choose to perform the service via the second communication requirement as an alternative in a case where the user determines that the fee for the communication service via the first communication requirement, despite being able to be performed, is too high, for example. The orchestrator receives the selection by the user of the first communication requirement or the second communication requirement based on the notified fees and controls the domain controller to secure the requested amount of resources identified as described above for the selection communication requirement.

In this manner, by notifying the user, before the service is performed, of the fees relating to the first communication requirement corresponding to the notified service requirement and the second communication requirement different to the first communication requirement, user-friendliness can be improved. Also, by the second communication requirement having at least one factor of the first communication requirement relaxed, in a case where the second communication requirement is selected, the ease of securing resources is increased, which is advantageous for the communications business operator. Furthermore, by creating a system in which fees are notified of in advance, the communications business operator can flexibly set the fees. For example, from the perspective of securing resources for each service using limited resources, a system in which the fee charged to the user changes depending on the ease of securing resources provides benefits to the communications business operator. In other words, for example, with conditions of performing communication with the same communication requirements, the communications business operator can determine to set the fee for a state in which resources are easily secured (for example, when radio resources or calculation resources are available) to a lower amount than the fee for a state in which resources are not easily secured. In this case, the fee varies depending on the time even when the same amount of resources are secured. However, the communications business operator, by notifying the user in advance of the fee as described above, can provide communications relating to the service with the user's consent. Also, the communications business operator can set the fee structure so that the fee increases the longer the amount of time the communications continue, for example.

Note that the communication requirement, for example, includes one or more elements from among: tolerable latency, tolerable error rate, required radio quality, transmission cycle, amount of data communicated in a predetermined time period (for example, per month, per week, or per day), and the like. Also, the orchestrator determines one communication requirement (the first communication requirement) corresponding to the notified service requirement and with set values for each of the factors and identifies at least one alternative candidate communication requirement (the second communication requirement) with at least one of these factors changed. For example, the second communication requirement may be a requirement with at least one of the factors described above relaxed. For example, the second communication requirement, may be a requirement that satisfies at least one of a greater tolerable latency, a higher tolerable error rate, or a lower required radio quality compared to the first communication requirement. Also, the second communication requirement may have a longer transmission cycle or less amount of data communicated in a predetermined time period compared to the first communication requirement. Note that the orchestrator may hold in advance a list of candidate communication requirements and identify a corresponding communication requirement and an alternative candidate communication requirement in response to receiving a service requirement.

An example of a list of communication requirements is illustrated in FIG. 2. The list of FIG. 2 includes a plurality of service level agreement (SLA) numbers and values for each factor of the communication requirements associated with the SLA numbers. The SLA number corresponds to the service requirement, and the orchestrator, in response to being notified of a service requirement, searches for the SLA number corresponding to the service requirement and identifies the communication requirements corresponding to the retrieved SLA number as the first communication requirement. For example, in a case where the notified service requirement corresponds to the SLA number "100", the orchestrator identifies as the first communication requirement the communication requirements including a tolerable latency of 1 hour, a tolerable error rate of 0.1%, a transmission cycle of 4 hours, a monthly data amount of 600 kB, and a required radio quality of 10 dB. Also, the orchestrator may identify as the second communication requirement the communication requirements corresponding to the SLA number "102" with a relaxed tolerable error rate, for example. Furthermore, the orchestrator may identify as the second communication requirement the communication requirements corresponding to the SLA number "101" with a relaxed transmission cycle, for example. Note that the orchestrator may identify the two sets of communication requirements of the SLA numbers "101" and "102" as the second communication requirements, for example. Also, note that the orchestrator may use a predetermined filtering such that the vastly different communication requirements, such as the SLA numbers "200" to "202" are not identified as the second communication requirement. For example, the communication requirements may be grouped on the basis of similarity, and an alternative candidate may be selected from the communication requirements that belong to the group including the communication requirement corresponding to the notified service requirement. In this case, each communication requirement may only belong to a single group, a communication requirement may belong to a plurality of groups.

The list of communication requirements may hold the communication requirements and information that identifies the amount of resources consumed in a case where the communication requirement is used associated together. Note that as illustrated in FIG. 2, the communication requirements and the consumed resource amount may be held in a single list or the communication requirements and the consumed resource amount may be held in a separate list. Note that in FIG. 2, the consumed resources are specified per resource type. For example, the amount for radio resources and the amount for calculation resources may be registered in the list. FIG. 2 illustrates an example in which two resources are registered as the resource consumption amount. However, a single resource or three or more resources may be registered for the resource consumption amount. For example, in addition to or instead of the radio resource and the calculation resource, information of the consumption amount of resources for the transport domain and the mobile core domain may be registered. The value of the consumed resource amount may be a value experimentally calculated in advance, or the orchestrator may obtain the resource amount used in the actual communication environment from the domain controllers and successively update the value. Also, the example of FIG. 2 is of a case in which the consumed resource amount is represented by a ratio in relation to the usable resource amount. However, instead of a relative value such as this, an absolute value may be used. Furthermore, in the example of FIG. 2, one consumed resource amount is listed for each of the resource types. However, the consumed resource amount may be set for each apparatus (for example, each RAN apparatus) involved in performing the service. For example, because the usable resource amount may differ per apparatus, even with the same communication requirement, this ratio may differ. Also, the frequency band and communication method may differ between a first RAN apparatus and a second RAN apparatus. Thus, the resource amount required to satisfy the communication requirements may be specified taking into consideration the characteristics of each apparatus. Accordingly, by performing a handover of a terminal apparatus to a second base station apparatus while identifying the first communication requirement on the basis of a first base station apparatus the terminal apparatus receiving the service is currently connected to, the orchestrator can determine whether or not the same communication requirement can be provided using a lower amount of resources.

For example, the orchestrator may identify, as the second communication requirement, a communication requirement with a lower consumed resource amount than the communication requirement corresponding to the notified service requirement. Also, at this time, the orchestrator may determine which of the plurality of communication requirements to set as the second communication requirement on the basis of how much of the resources of each type are already secured for existing other communications. In an example in which the communication requirement of the SLA number "100" is the first communication requirement, in a case where the surplus resource amount (the resource amount not used of the total amount of usable resource) of resource A is low and the surplus resource amount of resource B is sufficient, the communication requirement of the SLA number "102", where the consumption amount of resource B does not decrease but the consumption amount of resource A decreases, may be determined by the orchestrator as the second communication requirement. In a similar manner, in a case where the surplus resource amount of resource A is sufficient and the surplus resource amount of resource B is low, the communication requirement of the SLA number "101", where the consumption amount of resource A does not decrease but the consumption amount of resource B decreases, may be determined by the orchestrator as the second communication requirement. For example, in the case of a certain resource, if the sum of the secured resource amount for existing communication and an amount indicating how much of the resource will be used when communication with the first communication requirement is performed is greater than a predetermined value, a communication requirement that can decrease the use amount of that resource may be determined as the second communication requirement. Also, in a case where resource A and resource B are used in roughly the same amount, a communication requirement that can more greatly reduce the amount of the total use amount of the resource may be determined as the second communication requirement. In other words, as the second communication requirement, a communication requirement with a lower resource consumption amount than the first communication requirement may be determined on the basis of how much of the resource will be used in a case where communication is performed with the first communication requirement. Note that in a case where the surplus resource of resource A is sufficient and the surplus resource of resource B is relatively low, a communication requirement that increases the consumption amount of resource A may be selected as the second communication requirement. Also, in a case where the surplus resource of resource A and the surplus resource of resource B are sufficient, the communication requirement that requests more resources than the first communication requirement may be identified as the second communication requirement. For example, the orchestrator may set, as the second communication requirement, an alternative requirement with at least one of the factors of the first communication requirement being more severe. By notifying of the requirement with a more severe request relating to communication, the user can be presented with the option of a service with improved quality. For example, regarding video providing services, when the service requirement corresponds to HD video, the user can be presented with a requirement that enables 4K video to be provided. Note that in a case where such a requirement is presented, the fee may be set at roughly the same as the fee for the first communication requirement. Note that the orchestrator may select a plurality of the second communication requirements, such as the SLA numbers "101" and "102", for example. However, in a case where the surplus amount of a resource of one type is low, for example, a communication requirement that does not reduce the use amount of that resource may be omitted from the second communication requirement. Also, in a case where a large amount of resources have been secured for an existing communication, the orchestrator may determine, as the second communication requirement, a communication requirement that performs communication at a time period where the secured amount of that resource is low (for example, the time period from late at night to early morning). In other words, the communication requirement may include the time period communication is performed. Also, even in a case where a large amount of resources are not secured for an existing communication, the orchestrator may identify, as the second communication requirement, an alternative requirement that performs communication at a time period where the fee is less than when communicating with the first communication requirement. Also, in a case where resources cannot be secured continuously over a predetermined time period for communication with the notified service requirement, the orchestrator may set, as the second communication requirement, a communication requirement with the factor relating to latency from among the factors included in the first communication requirement being relaxed.

Also, the orchestrator may assign a priority level for each of the plurality of factors included in the communication requirement and determine which factor of the first communication requirement to relax on the basis of the priority level. For example, the orchestrator may identify, as the second communication requirement, a communication requirement with a relaxed factor with a low priority. Note that, for example, in a case where the amount of decrease in the resource consumption amount is insufficient (for example, a predetermined amount or less) even when the factor with the lowest priority level is relaxed, the orchestrator identifies the resource consumption amount for the communication requirement with the relaxed factor with the second lowest priority level. Then, in a case where the amount of decrease in the resource consumption amount is sufficient (for example, exceeds a predetermined amount), the orchestrator may identify, as the second communication requirement, this communication requirement. Also, in a case where the amount of decrease in the resource consumption amount is insufficient even when the factor with the second lowest priority level is relaxed, the orchestrator may determine whether or not the resource consumption amount will be sufficiently decreased by relaxing the factor with the third lowest priority level or relaxing the two factors with the first and second lowest priority level. In this manner, the orchestrator may determine whether or not to decrease the resource consumption amount by relaxing the factors into order from lowest priority level. Note that the information of the priority level may be designated by the user (the service provider or the end user) or may be set in advance in the system. Also, the communication requirement candidates may be assigned a priority order and the second communication requirement may be identified according to this priority order. For example, the priority order for other communication requirements (as an alternative candidate) may be determined depending on which communication requirement is identified as the first communication requirement, and a conditional priority order may be set in advance. In this case, after the first communication requirement is identified, the orchestrator references the priority order pre-set depending on the first communication requirement and identifies, as the second communication requirement, a communication requirement a predetermined number from the top of the priority order. Note that in this case, communication requirement that do not reduce the consumption amount of resources by a predetermined amount or greater may be not identified as the second communication requirement even if their priority is high.

Note that the orchestrator may hold in advance the required resource amount for both the first communication requirement and the second communication requirement as a list as described above and may obtain these by querying the domain controllers. The information of the amount of resources already in use may be obtained by the orchestrator querying the domain controllers or the domain controllers may periodically notify the orchestrator. The orchestrator is capable of obtaining the service requirement received from the user via the user apparatus, identify a first communication requirement and at least one second communication requirement on the basis of the service requirement, identify the amount of resources being requested for each of the communication requirements and the set fee corresponding to the amount of resources, notify the user of the fee corresponding to the communication requirements, and receive a selection of which communication requirement to use. As long as these operations are possible, the relationships between other apparatuses may be built in any manner. Also, the function of the orchestrator may be implemented by a single control apparatus or may be implemented by a plurality of apparatuses sharing the processing described above.

Note that the second communication requirement described above, for example, may be a requirement in which the entity that executes processing is changed from that of the first communication requirement. For example, in the second communication requirement, a frequency band, time, space, and the like of a radio resource different from that of the first communication requirement or a different calculation apparatus may be used. For example, in a case where the terminal apparatus receiving the service changes the frequency band or the connection destination cell to enable a radio resource with a relatively sufficient amount of surplus resources to be used, the orchestrator may identify, as the second communication requirement, a communication requirement that changes to this frequency band or connection destination cell. Even in a case where this communication requirement cannot decrease the use amount of radio resources, by the orchestrator using the radio resource with a relatively sufficient amount of surplus resources, the system can be stabilized and the radio resources of the entire system can be used more efficiently. Thus, the orchestrator may identify, as the second communication requirement, this communication requirement even if the use amount of the radio resources cannot be reduced. Also, the orchestrator may set the fee notified of in this case to an amount that is less than with the first communication requirement. Furthermore, in a case where a calculation apparatus, which is capable of executing a portion of the calculation processing for performing the service and has a low load, is present that is expected not to use the first communication requirement, the orchestrator may identify, as the second communication requirement, a communication requirement that uses this calculation apparatus. In this case as well, by using the calculation resources with a relatively sufficient amount of surplus resources, the system can be stabilized and the radio resources of the entire system can be used more efficiently. Thus, the orchestrator may identify, as the second communication requirement, this communication requirement even if the use amount of the calculation resources cannot be reduced or may set the fee notified of in this case to an amount that is less than with the first communication requirement. Note that by relaxing at least one factor of the first communication requirement, many alternative candidates can be identified to use the other radio resources or other calculation apparatuses. This can make the use of resources in the system more effective.

In a case where a predetermined condition is not satisfied, the orchestrator may not notify the user of the second communication requirement as described above. The predetermined condition may include, for example, a new service requirement being received. In other words, in a case where the service requirement received is not new, the user may not be notified of the second communication requirement. Also, the predetermined condition, for example, may include communication with the first communication requirement not being able to be performed with the amount of usable resources not being used. In other words, in a case where communications with the first communication requirement can be performed with the amount of usable resources not being used, the user may not be notified of the second communication requirement. Also, the predetermined, for example, may include the amount of usable resources not being used being a predetermined amount or less. In other words, in a case where the amount of usable resources not being used exceeds a predetermined amount, the user may not be notified of the second communication requirement. Also, the predetermined condition may include the user requesting notification of information relating to the second communication requirement. In other words, in a case where the user has not requested notification of information relating to the second communication requirement, the user may not be notified of the second communication requirement. For example, a notification of the second communication requirement may be sent only in a case where the user does not consent to the notified fee corresponding to the first communication requirement and requests a notification of another communication requirement and the fee. Also, for example, in a case where the user determines that the consumption amount of the resources is excessive and requests the second communication requirement to reduce the consumption amount of the resources, the user may be notified of the second communication requirement. Note that in this case, the orchestrator operates to notify the user of the use state and the reservation state of the resources. Also, the predetermined condition may include the amount of usable resources not used being changed. In other words, during the time when the amount of usable resources not being used does not change, the user may not be notified of the second communication requirement. Note that at this time, in cases other than when the amount of usable resources not being used is made greater than or less than the predetermined value by this amount changing, the user may not be notified of the second communication requirement.

The predetermined conditions described above are merely examples, and one or more of the conditions described above may not be include in the predetermined condition and other conditions may be included in the predetermined condition. In a case where one or a combination of the set predetermined conditions are satisfied, the orchestrator may notify the user of the second communication requirement. For example, in a case where the amount of usable resources not being used is changed due to the terminal apparatus being moved while performing communication, for example, even if other predetermined conditions are not satisfied, the user may be notified of the second communication requirement. Note that even in a case where the amount of usable resources not being used is changed, the orchestrator may not notify the user of the second communication requirement as long as one of or all of the other predetermined conditions are not satisfied. Also, the predetermined conditions described above may not be used. For example, the user may be notified of the second communication requirement regardless of the amount of free resources. Also, even in a case where the predetermined condition is satisfied, the orchestrator may not notify the user of the second communication requirement in a case where there is no appropriate second communication requirement (for example, there are no alternative candidate that reduce the used resource amount).

As described above, the orchestrator can notify a user which has been presented with a service requirement for performing a new service of the second communication requirement, which is an alternative candidate to the first communication requirement corresponding to the service requirement. However, another user that is already performing communication may be notified of the alternative candidate. In other words, instead of just notifying the user performing a new service, a user currently performing a service may be notified of a fourth communication requirement which is an alternative candidate to a third communication requirement currently in use. For example, a user of a terminal apparatus with the most amount of resource use amount or a terminal apparatus with a long reservation period (for example, longer than a predetermined length) may be notified of the fourth communication requirement to reduce the used resources. Accordingly, regarding communications using or reserving a large amount of resources, the used resources can be reduced and the resources can be used equally between users. Note that even in a case where the user of a terminal apparatus has a large use amount of resources or a long resource reservation period, depending on the type of service being performed, the user may be removed from who can be notified of the fourth communication requirement. For example, in a case where a service with a high priority level is being performed, the third communication requirement may be continuously used without the user of this service being notified of the fourth communication requirement. Note that in a case where the fourth communication requirement is notified of relating to an existing communication, the second communication requirement relating to a new communication described above may not be notified of or may be notified of. In other words, a communication requirement that can satisfy the service requirement can be used for a new communication and a communication requirement with at least one of the factors of relaxed can be used to an existing communication, or by relaxing the communication requirement for both the existing communication and the new communication to level of relaxation of each communication requirement can be kept to a minimum.

As described above, the orchestrator notifies the user of the first communication requirement corresponding to the notified service requirement, as well as the second communication requirement and the fees. In this manner, the user can be made aware of the trade-off relationship between the quality of the service and the fee, and a communication service more in line with the wishes of the user can be provided. For example, in a case where a service requirement for a video viewing service is presented by a user, the orchestrator may notify the user of the fees for a service with an image quality in line with the user's request and a service with a relatively lower image quality. Also, regarding a tracking service, the user may be notified of the fees for a service with a communication frequency in line with the user's request and a service provided at a lower communication frequency. Furthermore, regarding a navigation service, the user may be notified of the fees in a case where a selection service of a highly accurate movement route is performed in line with the user's request and a case where a service with lower accuracy or fewer candidates, i.e., less calculation resources, is performed. In addition, with various applications, the user-friendliness and the user satisfaction can be improved by presenting to the user options on the basis of the communication requirement corresponding to the service requirement presented by the user and the relaxed communication requirement and the user selection the appropriate communication requirement.

Note that in the embodiment described above, the processing for when a new service is started is described. However, no such limitation is intended. For example, regarding a service being performed, even in a case where an additional service requirement is designated, the processing described above can be applied. In this case, the communication requirement corresponding to the added service requirement and the amount of resources requested by the communication requirement are identified, and the fee corresponding to the amount of resources is identified. Note that in a case where the orchestrator determines that communication with the communication requirement corresponding to the added service requirement cannot be implemented due to a lack of resources or the like, for example, the user can be notified that the service requirement cannot be satisfied and notified of an alternative communication requirement (the second communication requirement).

Also, in a case where the communication requirement cannot be satisfied with a single domain (for example, the RAN domain), the orchestrator may determine whether or not the entire network can satisfy the communication requirement with the communication requirement with the other domains (the transport domain and the mobile core domain) becoming severe. For example, take a case where a service requirement is received, and the orchestrator queries the domain controllers as to whether a corresponding communication requirement can be satisfied and receives a notification from at least one of the domain controllers that at least one of the factors of the communication requirement cannot be satisfied. In this case, the orchestrator sends another query to other domain controllers as to whether the at least one factor can be set to a more severe level. Then, in a case where a reply is received saying that such a setting is possible, the orchestrator may determine that it is possible to perform communication that satisfies the service requirement notified of by the user. Note that the orchestrator may function as a mediator between the domains or may not function as a mediator.

Apparatus Configuration

Figure 3:
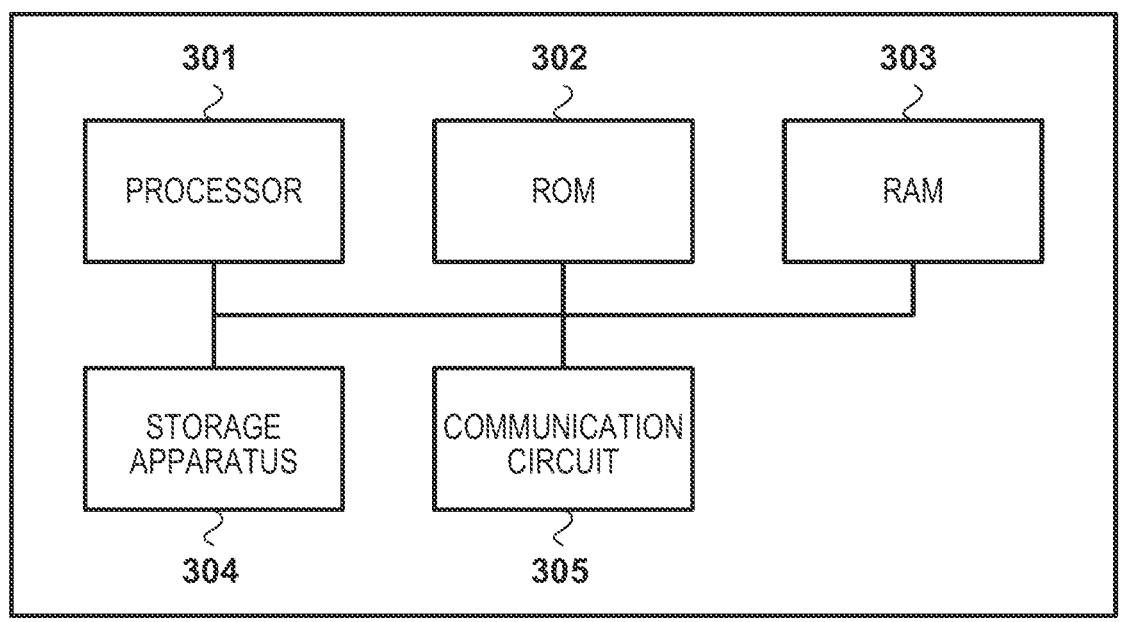
FIG. 3 is a diagram illustrating an example configuration of the hardware of an orchestrator.

Next, the configuration of the orchestrator (control apparatus) will be described. FIG. 3 is a diagram illustrating an example configuration of the hardware of the orchestrator. The orchestrator includes, for example, a processor 301, ROM 302, RAM 303, a storage apparatus 304, and a communication circuit 305. The processor 301 is a computer, such as a general-purpose central processing unit (CPU), an application specific integrated circuit (ASIC), or the like, including one or more processing circuits. By the processor 301 reading out and executing a program stored in the ROM 302 and the storage apparatus 304, the processing of the entire apparatus and the processing described above are executed. The ROM 302 is read-only memory that stores information, such as a program relating to processing executed by the orchestrator, various parameters, and the like. The RAM 303 is random-access memory that functions as a work space when the processor 301 executes a program and temporary stores information. The storage apparatus 304 is constituted by a detachable external storage device, for example. The communication circuit 305 is constituted by a circuit for wired communication or wireless communication, for example. The orchestrator may include a circuit for network connection for executing communication (wired or wireless) with the domain controllers and the user apparatus. Note that in FIG. 3, only a single communication circuit 305 is illustrated, but the apparatuses may include a plurality of communication circuits.

Figure 4:
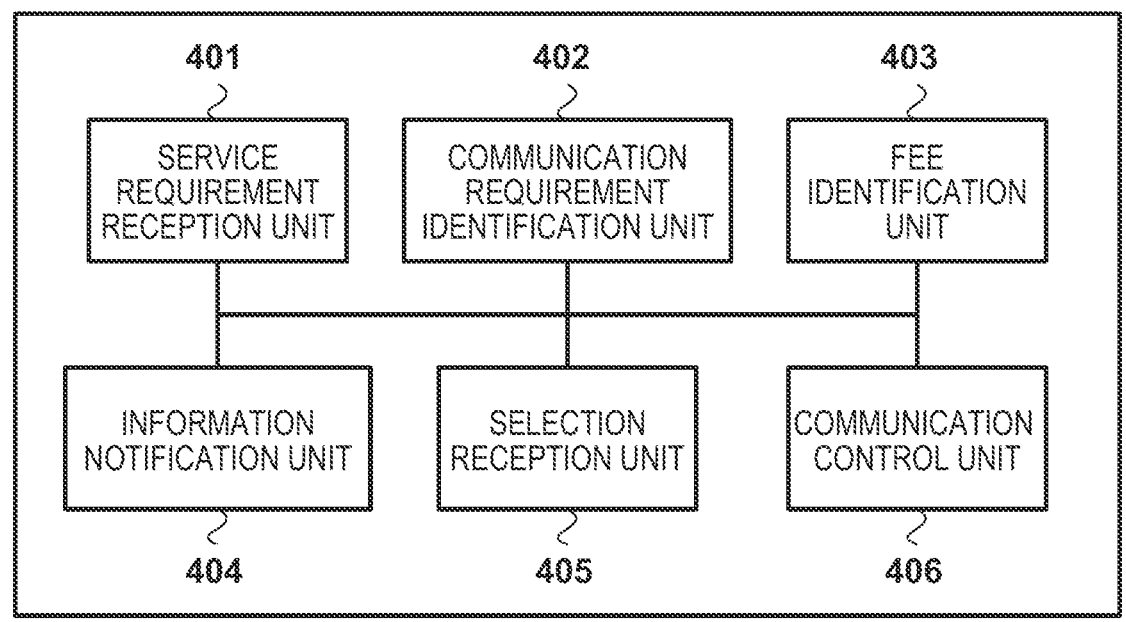
FIG. 4 is a diagram illustrating the functional configuration of the orchestrator.

FIG. 4 is a diagram illustrating the functional configuration of the orchestrator. The orchestrator, as a function, includes a service requirement reception unit 401, a communication requirement identification unit 402, a fee identification unit 403, an information notification unit 404, a selection reception unit 405, and a communication control unit 406, for example.

The service requirement reception unit 401 receives information of the service requirement for the service to be performed from the user apparatus. The service requirement reception unit 401, for example, receives information of the service requirement from a terminal apparatus of an end user or an information processing apparatus used by a service provider. For example, the terminal apparatus of an end user may send a request to the service provider for a service to be performed using communication, and the service provider may notify the orchestrator of the service requirement for the service. Note that the terminal apparatus of the end user may, when there is a request to perform a service, notify of information identifying which service of the services provided by the service provider to request, and the service provider may identify the service requirement on the basis of this information and notify the orchestrator. Also, the terminal apparatus of the end user may notify the orchestrator that a predetermined communication service with a service requirement set in advance is to be performed. Note that the service requirement reception unit 401 may receive not only a service requirement for a new service, but also an additional service requirement for an existing service.

The communication requirement identification unit 402 identifies the first communication requirement corresponding to the service requirement received by the service requirement reception unit 401 and at least one second communication requirement, which is an alternative candidate to the first communication requirement. The fee identification unit 403 identifies the amount of resources required for the first communication requirement and the second communication requirement identified by the communication requirement identification unit 402 and identifies the fees set according to the resource amounts. Note that the identification method here is as described above, and thus a description thereof is omitted. The information notification unit 404 notifies the user that presented the service requirement via the service requirement reception unit 401 of information indicating the communication requirement identified by the communication requirement identification unit 402 and the information of the fees identified by the fee identification unit 403 for the communication requirement.

Note that after the first communication requirement corresponding to the service requirement received via the service requirement reception unit 401 is identified, at least one fourth communication requirement, which is an alternative candidate to the third communication requirement for a (existing) service being performed, may be identified by the communication requirement identification unit 402. In this case, the fee identification unit 403 also identifies the fees for the fourth communication requirement, and the information notification unit 404 may notify the user (end user or service provider) of the service being performed of the information of the fourth communication requirement and the corresponding fee. In other words, the information notification unit 404 may notify a user different from the user that presented the service requirement via the service requirement reception unit 401 of information. Note that in a case where the fourth communication requirement is notified of, the second communication requirement may not be identified/notified of, and the second communication requirement and the fourth communication requirement may be identified/notified of together.

The selection reception unit 405 obtains information indicating which communication requirement, of the communication requirements the information notification unit 404 notified the user of, has been selected by the user from the user apparatus that is the destination of the communication requirement notification described above (or another apparatus associated with the user apparatus in advance via a user account or the like). The communication control unit 406 controls the domain controllers to perform communication with the selected communication requirement in response to the selection received from the selection reception unit 405. The domain controllers, under this control, control the apparatuses in their control and make them perform communication with the terminal apparatus which is the service providing destination.

Process Flow

Next, the flow of processing according to the present embodiment will be described using FIG. 5. Note that FIG. 5 illustrates an example in which, when the user apparatus starts a new service, the user apparatus is notified of the first communication requirement and the second communication requirement, which is an alternative candidate. However, as described above, the present embodiment is not limited thereto, and an alternative candidate communication requirement for the communication being performed may be identified, and the user apparatus associated with this communication may be notified of the alternative candidate communication requirement.

In the present processing, first, the user apparatus (for example, the terminal apparatus of the end user or the information processing apparatus of the network operator) notifies the orchestrator of a service requirement (requested service level). Then, the orchestrator identifies the communication requirement corresponding to the notified service requirement as the first communication requirement and identifies at least one second communication requirement, which is an alternative candidate to the first communication requirement. For example, a communication requirement which has at least one of the factors included in the first communication requirement relaxed and can decrease the requested resource amount a predetermined amount or greater as the second communication requirement. Note that as described above, the second communication requirement may be identified on the basis of various points other than this. Note that instead of or in addition to an alternative requirement for the communication requirement for a new service, an alternative requirement may be identified for a communication requirement used in communications being performed.

Then, the orchestrator identifies the amount of requested resources (for example, radio resources or calculation resources) for the identified alternative requirement. At this time, the orchestrator may use the resource use amount identified in advance in a list such as that illustrated in FIG. 2 as the requested resource amount or, as illustrated in FIG. 5, may identify the amount of resources requested by querying the domain controller. In FIG. 5, the orchestrator transmits the identified first communication requirement and the second communication requirement to the domain controller and sends a request to the domain controller for an estimation of the used resource amount. Then, the domain controller cooperates with the apparatus (a RAN apparatus in a RAN domain, a transport apparatus in a transport domain, a mobile core apparatus in a mobile core domain, and the like) for executing the communication processing in the domain and identifies the amount of resources to be used. Next, the domain controller notifies the orchestrator of the identified resource use amount. Note that in a case where the communication requirement can be satisfied by a plurality of methods, such as when the domain controller has a plurality of apparatuses under their control, for one communication requirement, the domain controller may identify a plurality of patterns for the use resource amount and notify the orchestrator of them. For example, the orchestrator may be notified of patterns, such as a first pattern in which the radio resource consumption is greater but the calculation resource consumption is low, a second pattern in which the calculation resource consumption is great but the radio resource consumption is less, or the like. Note that the identified resource use amount here may naturally increase as the time period in which the service is performed increases. In other words, the resource use amount may be the resource amount up until the end of a series of services. However, no such limitation is intended, and, for example, a resource use amount per a predetermined time period may be identified.

Thereafter, the orchestrator identifies the fee corresponding to the identified resource amount. At this time, for example, a flexible fee setting may be used, such as setting high fees per use amount for the resources of a type with a high usage rate with the existing communication or setting low fees per use amount for the resources of a type with a low usage rate. In another example, the fee setting may be such that the fee is higher the more need there is to secure resources over a long time period. The orchestrator identifies the fee for the first communication requirement and the second communication requirement as per the fee setting. Note that as described above, in a case where a plurality of patterns of resource use amount are identified for a single communication requirement, the fees of the patterns may be identified. Also, the orchestrator, for example, may identify the pattern with the lowest fee from among the plurality of patterns as the resource use amount for the communication requirement. Note that the orchestrator may identify the pattern that contributes most to the stability of the communication service from among the plurality of patterns as the resource use amount for the communication requirement. In other words, in a case where there are a plurality of patterns of the resource use amount for a single communication requirement, the orchestrator may select the best pattern for the communications business operator. Note that in this case, the orchestrator may select the best pattern for the communications business operator as well as identifying the lowest fee from among the fees corresponding to the plurality of patterns as the fee corresponding to the communication requirement. This adds an incentive to performing communication with the pattern that is best for the communications business operator.

When the fee is identified, the orchestrator notifies the user apparatus of the first communication requirement, the second communication requirement, and the corresponding fees. Note that in a case where the fourth communication requirement relating to communications being performed is identified, the user apparatus associated with the communications being performed may be notified of the fourth communication requirement and the fee. Note that the orchestrator, for example, may notify of only information relating to the second communication requirement without notifying of the first communication requirement and the second communication requirement. In this case, only the portion different from the first communication requirement is notified of as the second communication requirement. For example, the orchestrator may notify the user apparatus of information including a latency requirement of the second communication requirement which is relaxed compared to that of the first communication requirement. When the user apparatus receives this information, the user is notified of, via a display or the like, the fee in a case where the communication requirement corresponding to the service requirement is used and information, for example, indicating how much the fee would decrease in a case where the latency requirement is relaxed. Also, the user may determine which communication requirement to select on the basis of the notified information. Note that the user may refuse all of the notified requirements, and in this case, the processing returns to identifying the communication requirement. Note that in a case where the user refuses all of the communication requirements capable of being implemented, the orchestrator may notify the user that the service requirement notified of by the user cannot be satisfied and end the processing.

When the orchestrator receives the communication requirement to use, the orchestrator transmits a control signal for the controlling the domain controller such that the resources are secured for communication with the selected communication requirement. The domain controller controls the apparatuses under its control according to this signal, secures resources, and starts communication relating to the requested service.

Note that in the example described above, the user is notified of the fee set for the amount of requested resources for each of the plurality of communication requirements identified on the basis of the service requirement. However, no such limitation is intended. For example, in a case where there is an agreement with the user to pay a fixed amount, a counter value of how much resources will be used may be identified and the user may be notified of this. Also, in a case where there is an agreement with the user regarding the format of the purchase of points corresponding to an amount of usable resources, the user may be notified of information such as the point consumption amount corresponding to the resource use amount. In other words, in one aspect, the information of the fee is information relating to the amount of usable resources, but in other aspects, the user may be notified of information relating to the amount of resources requested for each communication requirement. In this case, the information relating to the amount of resources requested for each communication requirement may be information relating to the price charged to the user, such as a fee or points, or may be information with no connection to price such as a counter of the amount of resources used in a fixed amount system agreement time.

As described above, according to the present embodiment, a user that has presented a service requirement is presented with information of not only whether or not communication with the service requirement is possible, but also information relating to the amount of resources required for the communication and information relating to an alternative communication requirement and the amount of resources used in the case of using the alternative communication requirement. In this manner, the user can be given various options, and user-friendliness can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control apparatus comprising one or more processors configured to:
   identify, on the basis of a service requirement received from a user, a first communication requirement and identify a second communication requirement which is an alternative candidate to the first communication requirement;
   identify an amount of resource requested for the first communication requirement and the second communication requirement, wherein a communication requirement that requests less amount of resources than an amount of resources requested for the first communication requirement, is identified as the second communication requirement;
   notify the user of information indicating the second communication requirement and information relating to the amount of the resource identified for each of the first communication requirement and the second communication requirement;
   receive a selection of the first communication requirement or the second communication requirement by the user;
   execute control to secure the resource amount identified for the communication requirement selected by the user.

2. The control apparatus according to claim 1, wherein the first communication requirement and the second communication requirement include a plurality of factors, each with a priority level attached; and
   the one or more processors are configured to identify, on the basis of the priority level, the second communication requirement as a communication requirement with at least one of the plurality of factors of the first communication requirement being relaxed.

3. The control apparatus according to claim 2, wherein the priority level for the plurality of factors is set by the user.

4. The control apparatus according to claim 1, wherein the resource includes a first type of resource and a second type of resource; and
   the one or more processors are configured to identify the second communication requirement on the basis of how much of the first type of resource and the second type of resource will be used by the second communication requirement.

5. The control apparatus according to claim 4, wherein the one or more processors are configured to identify the second communication requirement also on the basis of how much of the first type of resource and the second type of resource will be used by the first communication requirement.

6. The control apparatus according to claim 4, wherein the one or more processors are configured to identify the second communication requirement on the basis of an amount of the first type of resource and the second type of resource already secured.

7. The control apparatus according to claim 6, wherein the one or more processors are configured to identify, as the second communication requirement, a requirement of performing communication at a time period with a low amount of at least one of the first type of resource or the second type of resource already secured.

8. The control apparatus according to claim 1, wherein in a case where a resource cannot be continuously secured for a predetermined time period, the one or more processors are configured to identify the second communication requirement as a communication requirement with a factor relating to latency of the first communication requirement being relaxed.

9. The control apparatus according to claim 1, wherein a priority order is set in advance for the plurality of communication requirements; and
   the one or more processors are configured to identify the second communication requirement from the plurality of communication requirements according to the priority order.

10. The control apparatus according to claim 1, wherein the one or more processors are configured to identify, as the second communication requirement, a communication requirement of performing communication at a time period different from a time period during which communication with the first communication requirement is performed which has a lower fee than when communication with the first communication requirement is performed.

11. The control apparatus according to claim 1, wherein in a case where an amount of usable resources not being used is equal to or greater than a first predetermined amount, the one or more processors are configured to identify, as the second communication requirement, a communication requirement that requests more resources than the first communication requirement.

12. The control apparatus according to claim 1, wherein the one or more processors are configured not to notify the user of information of the second communication requirement in a case where a predetermined condition is not satisfied; and
   the predetermined condition includes at least one of:
   the service requirement being newly received,
   communication with the first communication requirement being unable to be performed with an amount of usable resources not being used,
   an amount of usable resources not being used being equal to or less than a second predetermined amount,
   the user requesting notification of information relating to the second communication requirement, and
   an amount of usable resources not being used being changed.

13. The control apparatus according to claim 1, wherein the one or more processors are configured to:
   identify a fourth communication requirement, which is an alternative requirement to a third communication requirement for communication for a service of another user; and
   notify the other user of information relating to the fourth communication requirement.

14. The control apparatus according to claim 13, wherein in a case where the other user is notified of information relating to the fourth communication requirement, the one or more processors are configured not to notify the user of information relating to the second communication requirement.

15. The control apparatus according to claim 13, wherein the other user is determined on the basis of at least one of a resource use amount, a resource reservation period, or a service requirement of the other user.

16. The control apparatus according to claim 1, wherein in a case where an amount of usable resources not being used is changed, the one or more processors are configured to notify the user of information relating to the second communication requirement.

17. A control method executed by a control apparatus comprising:
- on the basis of a service requirement received from a user, identifying a first communication requirement and identifying a second communication requirement which is an alternative candidate to the first communication requirement;
- identifying an amount of resource requested for the first communication requirement and the second communication requirement, wherein a communication requirement that requests less amount of resources than an amount of resources requested for the first communication requirement, is identified as the second communication requirement;
- notifying the user of information indicating the second communication requirement and information relating to the amount of the resource identified for each of the first communication requirement and the second communication requirement;
- receiving a selection of the first communication requirement or the second communication requirement by the user; and
- executing control to secure the resource amount identified for the communication requirement selected by the user.

18. A non-transitory computer-readable storage medium that stores a program for causing a computer provided in a control apparatus to execute:
- on the basis of a service requirement received from a user, identifying a first communication requirement and identifying a second communication requirement which is an alternative candidate to the first communication requirement;
- identifying an amount of resource requested for the first communication requirement and the second communication requirement, wherein a communication requirement that requests less amount of resources than an amount of resources requested for the first communication requirement, is identified as the second communication requirement;
- notifying the user of information indicating the second communication requirement and information relating to the amount of the resource identified for each of the first communication requirement and the second communication requirement;
- receiving a selection of the first communication requirement or the second communication requirement by the user, and
- controlling to secure the resource amount identified for the communication requirement selected by the user.

* * * * *